US010482019B2

(12) United States Patent
Adachi et al.

(10) Patent No.: US 10,482,019 B2
(45) Date of Patent: Nov. 19, 2019

(54) STORAGE APPARATUS AND CONTROL METHOD THEREOF

(71) Applicant: Hitachi, Ltd., Tokyo (JP)

(72) Inventors: Taku Adachi, Tokyo (JP); Hisaharu Takeuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/776,135

(22) PCT Filed: Feb. 24, 2016

(86) PCT No.: PCT/JP2016/055495
§ 371 (c)(1),
(2) Date: May 15, 2018

(87) PCT Pub. No.: WO2017/145302
PCT Pub. Date: Aug. 31, 2017

(65) Prior Publication Data
US 2018/0329824 A1    Nov. 15, 2018

(51) Int. Cl.
*G06F 12/08*  (2016.01)
*G06F 12/0862*  (2016.01)
*G06N 20/00*  (2019.01)

(52) U.S. Cl.
CPC ......... *G06F 12/0862* (2013.01); *G06N 20/00* (2019.01); *G06F 2212/1021* (2013.01);
(Continued)

(58) Field of Classification Search
CPC .... G06F 12/0862; G06F 12/0868; G06F 3/06; G06F 2212/502; G06F 2212/313;
(Continued)

(56) References Cited

U.S. PATENT DOCUMENTS 6,253,289 B1 *  6/2001  Bates, Jr. et al. ....... G06F 12/00
                                                    711/137
9,984,004 B1 *  5/2018  Little et al. ........... G06F 12/128
                                                    12/128

(Continued)

FOREIGN PATENT DOCUMENTS

JP   09-160726 A   6/1997
JP   2000-357125 A  12/2000

(Continued)

OTHER PUBLICATIONS

International Search Report of PCT/JP2016/055495 dated Apr. 12, 2016.

*Primary Examiner* — Hiep T Nguyen

(74) *Attorney, Agent, or Firm* — Mattingly & Malur, PC

(57) ABSTRACT

Proposed are a storage apparatus and a control method thereof capable of improving the response performance to a read access of various access patterns. When data to be read is not retained in a data buffer memory, upon staging the data to be read, a processor performs sequential learning of respectively observing an access pattern in units of blocks of a predetermined size and an access pattern in units of slots configured from a plurality of the blocks regarding an access pattern of the read access from the host apparatus, and expands a data range to be staged as needed based on a learning result of the sequential learning.

16 Claims, 9 Drawing Sheets

(52) U.S. Cl.
CPC ........... *G06F 2212/6022* (2013.01); *G06F 2212/6026* (2013.01)

(58) Field of Classification Search
CPC ........... G06F 13/28; G06F 2212/1021; G06F 2212/6022; G06F 2212/6026; G06N 20/00
See application file for complete search history.

(56) References Cited

U.S. PATENT DOCUMENTS

| | | | |
|---|---|---|---|
| 2007/0067382 A1* | 3/2007 | Sun | G06F 15/16 709/203 |
| 2007/0220208 A1 | 9/2007 | Nomura et al. | |
| 2008/0016275 A1 | 1/2008 | Sebastian et al. | |
| 2014/0297965 A1* | 10/2014 | Jayaseelan et al. | G06F 12/0862 12/862 |
| 2015/0067266 A1* | 3/2015 | Jafri et al. | G06F 12/122 711/136 |
| 2015/0143057 A1* | 5/2015 | Pavlou et al. | G06F 12/0862 12/862 |
| 2016/0055086 A1* | 2/2016 | Fan | G06F 12/0848 12/848 |
| 2017/0220476 A1* | 8/2017 | Qi et al. | G06F 12/0888 12/888 |

FOREIGN PATENT DOCUMENTS

| | | |
|---|---|---|
| JP | 2002-278905 A | 9/2002 |
| JP | 2010-532520 A | 10/2010 |
| JP | 4915774 B2 | 4/2012 |

\* cited by examiner

US 10,482,019 B2

STORAGE APPARATUS AND CONTROL METHOD THEREOF

TECHNICAL FIELD

The present invention relates to a storage apparatus and to a control method of such a storage apparatus, and can be suitably applied, for example, to a storage apparatus including a buffer memory for temporarily retaining data to be read from and written into a storage device.

BACKGROUND ART

Conventionally, a prefetch function has been known as one function of a storage apparatus. A prefetch function is a function of learning an access pattern from a host apparatus (this is hereinafter referred to as the "sequential learning"), and, upon determining that the access pattern is a sequential access of continuously reading data from a continuous region, staging in advance the data stored in the next continuous region before the subsequent read request is given. Note that the term "staging" refers to the processing of reading data, which is stored in a storage device such as a hard disk device, into a buffer memory within a storage apparatus.

According to this kind of prefetch function, because it is possible to immediately send the requested data to the host apparatus when a read request of the next continuous region in the logical volume is given, the response performance of the overall storage apparatus can be improved.

In the foregoing case, a logical storage area (this is hereinafter referred to as the "logical volume") that is provided by the storage apparatus to the host apparatus is divided into units referred to logical blocks of a predetermined size, and an address that is unique to each logical block (this is hereinafter referred to as the "logical block address (LBA)") is assigned to the logical blocks for managing the logical blocks. A read request from the host apparatus to the storage apparatus is given by designating the logical block address of the front-end logical block of the storage area from which data is to be read, and the data length of the data to be read.

Thus, the sequential learning of the prefetch function described above is performed by observing the continuity of the logical block address of the storage area from which data is to be read. Specifically, when the logical block address of the back-end logical block of the storage area where the data read designated in the previous read request is to be performed, and the logical block address of the front-end logical block of the storage area where the data read designated in the current read request are continuous, it is determined that the read access from the host is a sequential access.

Note that PTL 1 discloses quantifying the continuity of data placement based on the cache hit ratio and determining the prefetch amount according to the quantified continuity and read access status in relation to the prefetch function of a storage apparatus.

CITATION LIST

Patent Literature

[PTL 1] Japanese Patent No. 4915774

SUMMARY OF THE INVENTION

Problems to be Solved by the Invention

Meanwhile, because a conventional storage apparatus performed the sequential learning based only on the continuity of the logical block address of the storage area from which data is to be read as described above, there was a problem in that only local sequential learning could be performed.

In the foregoing case, if broader sequential learning could be performed, for instance, it may be possible to perform a prefetch corresponding to an access pattern in which access for reading data is made sequentially from random storage areas while the logical block address gradually increases, or, conversely, an access pattern in which access for reading data is made sequentially from random storage areas while the logical block address gradually decreases. Consequently, it may be possible to improve the response performance even when the read access is of the access pattern described above.

Meanwhile, in recent years, the performance of storage apparatuses continues to improve, and storage apparatuses equipped with a plurality of microprocessors for processing read requests and write requests from the host apparatus have been commercialized. In the ensuing explanation, the configuration of this kind of storage apparatus is referred to as a "multi microprocessor configuration".

With a storage apparatus having this kind of multi microprocessor configuration, the sequential learning of the prefetch function described above is performed in units of microprocessors, the learning results of the sequential learning are also retained in units of microprocessors, and other microprocessors are unable to refer to the learning results. Moreover, with this type of storage apparatus, because the processing of the read request or the write request from the host apparatus is assigned to the microprocessor with the smallest load at such point in time, the read request from the same host apparatus is not necessarily assigned to the same microprocessor each time. Thus, even when the access from the host apparatus is a sequential access, there was a problem in that efficient sequential learning could not be performed due to the delay in the recognition of such sequential access by the microprocessor.

In addition, with a storage apparatus having this kind of multi microprocessor configuration, because the individual microprocessors respectively store and manage, in a dedicated local memory having a small capacity assigned to itself, the learning results of the sequential learning, the data volume of the learning results that can be retained by each microprocessor is limited, and there is a problem in that the range where the access pattern from the host apparatus can be observed (range in which sequential learning can be performed) is limited.

The present invention was devised in view of the foregoing points, and an object of this invention is to propose a storage apparatus and a control method thereof capable of (1) improving the response performance to a read access of various access patterns, and (2) performing sequential learning efficiently.

Means to Solve the Problems

In order to achieve the foregoing object, the present invention provides a storage apparatus which provides, to a host apparatus, a storage area for reading or writing data, comprising: one or more storage devices which provide the storage area; a processor which reads data to be read from the storage area according to a read request given from the host apparatus; and a data buffer memory which temporarily retains the data read from the storage area, wherein the processor: when the data to be read is not retained in the data buffer memory, executes staging of reading the data to be read from the storage area into the data buffer memory, and sends the staged data to be read to the host apparatus; and upon staging the data to be read, performs sequential learning of respectively observing an access pattern in units of blocks of a predetermined size and an access pattern in units of slots configured from a plurality of the blocks regarding an access pattern of the read access from the host apparatus, and expands a data range to be staged as needed based on a learning result of the sequential learning.

According to the storage apparatus of the present invention, because staging of an appropriate data range can be efficiently performed for various access patterns, the response performance to the read access can be improved.

Moreover, in the storage apparatus of the present invention, the processor is provided in a plurality, and each of the processors shares first access observation information as a learning result of the sequential learning in units of the blocks and second access observation information as a learning result of the sequential learning in units of the slots, updates the first access observation information based on the learning result of the sequential learning in units of the blocks, and updates the second access observation information based on the learning result of the sequential learning in units of the slots.

According to the storage apparatus of the present invention, learning can be completed more promptly in comparison to cases where each processor independently performs such learning.

Furthermore, in the storage apparatus of the present invention, each of the processors: shares the second access observation information of a predetermined number of the access areas in which a count of the read access is high among the access areas configured from a plurality of the slots; and when the read access is designating the access area without the second access observation information as an access destination, replaces the second access observation information corresponding to the access area with a lowest access count among the second access observation information with the second access observation information corresponding to the access area of the access destination of the read access.

According to the storage apparatus of the present invention, the second access observation information can be managed efficiently with a small memory capacity.

The present invention additionally provides a control method of a storage apparatus which provides, to a host apparatus, a storage area for reading or writing data, wherein the storage apparatus includes: one or more storage devices which provide the storage area; a processor which reads data to be read from the storage area according to a read request given from the host apparatus; and a data buffer memory which temporarily retains the data read from the storage area, wherein the control method comprises: a first step of the processor, when the data to be read is not retained in the data buffer memory, executing staging of reading the data to be read from the storage area into the data buffer memory, sending the staged data to be read to the host apparatus, and, upon staging the data to be read, performing sequential learning of respectively observing an access pattern in units of blocks of a predetermined size and an access pattern in units of slots configured from a plurality of the blocks regarding an access pattern of the read access from the host apparatus; and a second step of the processor expanding a data range to be staged as needed based on a learning result of the sequential learning.

According to the control method of a storage apparatus of the present invention, because staging of an appropriate data range can be efficiently performed for various access patterns, the response performance to the read access can be improved.

Moreover, in the control method of a storage apparatus of the present invention, the storage apparatus is provided with a plurality of the processors, and, in the first step, each of the processors shares first access observation information as a learning result of the sequential learning in units of the blocks and second access observation information as a learning result of the sequential learning in units of the slots, updates the first access observation information based on the learning result of the sequential learning in units of the blocks, and updates the second access observation information based on the learning result of the sequential learning in units of the slots.

According to the storage apparatus of the present invention, learning can be completed more promptly in comparison to cases where each processor independently performs such learning.

Furthermore, in the control method of a storage apparatus of the present invention, each of the processors shares the second access observation information of a predetermined number of the access areas in which a count of the read access is high among the access areas configured from a plurality of the slots; and, in the first step, each of the processors, when the read access is designating the access area without the second access observation information as an access destination, replaces the second access observation information corresponding to the access area with a lowest access count among the second access observation information with the second access observation information corresponding to the access area of the access destination of the read access.

According to the storage apparatus of the present invention, the second access observation information can be managed efficiently with a small memory capacity.

Advantageous Effects of the Invention

According to the present invention, it is possible to improve the response performance to a read access of various access patterns, and perform sequential learning efficiently.

DESCRIPTION OF EMBODIMENTS

An embodiment of the present invention is now explained in detail with reference to the appended drawings.

(1) Configuration of Information Processing System According to this Embodiment

Figure 1:
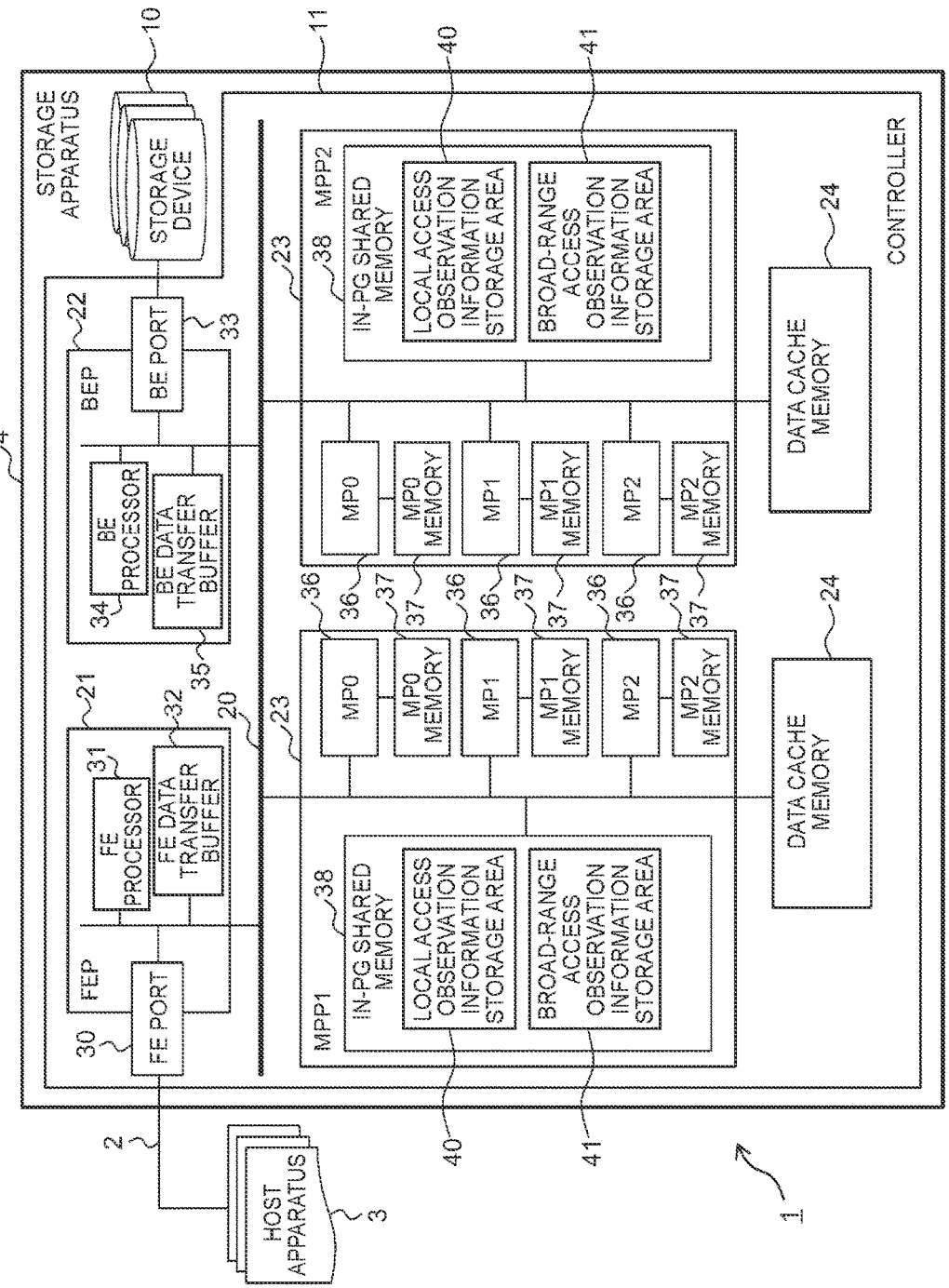
FIG. 1 is a block diagram showing a configuration of the information processing system according to this embodiment.

In FIG. 1, reference numeral 1 represents the overall information processing system according to this embodiment. The information processing system 1 comprising a host apparatus 3 and a storage apparatus 4 which are connected via a communication path such as a cable, a LAN (Local Area Network), a SAN (Storage Area Network) or the internet.

In FIG. 1, reference numeral 1 represents the overall information processing system according to this embodiment. The information processing system 1 is configured by comprising a host apparatus 3 and a storage apparatus 4 which are connected via a communication path such as a cable, a LAN (Local Area Network), a SAN (Storage Area Network) or the internet.

The host apparatus 3 is a computer device comprising information processing resources such as a CPU (Central Processing Unit), a memory, a network interface, an input device and an output device, and is configured, for example, from a personal computer, a workstation or a mainframe. The host apparatus 3 is loaded with an application corresponding to the user's business, and the application requests the reading/writing of data to the storage apparatus 4 via the communication path 2.

The storage apparatus 4 is configured by comprising a plurality of storage devices 10, and a controller 11 which controls the input/output of data to and from the storage devices 10.

The storage device 10 is configured, for example, from an expensive disk device which uses a SCSI (Small Computer System Interface) disk or the like, or an inexpensive disk device which uses a SATA (Serial AT Attachment) disk or an optical disk, or an SSD (Solid State Drive). One parity group is configured from one or more storage devices 10, and one or more logical volumes are defined in a storage area provided by one or more parity groups. Data from the host apparatus 3 is stored in the logical volumes in units of logical blocks of a predetermined size.

A unique identifier (this is hereinafter referred to as the "volume ID") is assigned to each logical volume. The reading/writing of data from and into the storage apparatus 4 is performed by designating the address of the front-end logical block of the access destination, and the data length, with a combination of the volume ID and the logical block number (LBA) of each logical block as the address.

The controller 11 is configured by comprising one or more front-end packages 21, one or more back-end packages 22, one or more microprocessor packages 23, and one or more data cache memories 24 which are mutually connected via an internal network 20.

The front-end package 21 functions as an interface during communication with the host apparatus 3, and comprises one or more front-end ports 30 which are connected to the host apparatus 3. A unique address such as an IP (Internet Protocol) address or a WWN (World Wide Name) is assigned to the front-end port 30.

Moreover, the front-end package 21 additionally comprises information processing resources such as a front-end processor 31 and a front-end data transfer buffer 32. The front-end processor 31 is a processor which governs the operational control of the overall front-end package 21. Furthermore, the front-end data transfer buffer 32 is configured from a semiconductor memory, and is used for temporarily retaining the data to be transferred to and from the host apparatus 3.

The back-end package 22 functions as an interface during communication with the storage device 10, and comprises one or more back-end ports 33. Each back-end port 33 is electrically and physically connected to the corresponding storage device 10 via a communication cable such as a fiber channel cable.

Moreover, similar to the front-end package 21, the back-end package 22 additionally comprises information processing resources such as a back-end processor 34 and a back-end data transfer buffer 35. The back-end processor 34 is a processor which governs the operational control of the overall back-end package 22, and, for instance, reads/writes data from and into the corresponding storage device 10 via the back-end port 33. Furthermore, the back-end data transfer buffer 35 is configured from a semiconductor memory, and is used for temporarily retaining the data to be transferred to and from the storage device 10.

The microprocessor package 23 comprises a plurality of microprocessors 36, a plurality of local memories 37 individually connected to each of the microprocessors 36, and an in-package shared memory 38.

The microprocessor 36 is a processor with a function of governing the operational control of the overall storage apparatus, and, for instance, reads/writes data from and into the corresponding storage device 10 via the back-end package 22 according to the read request or the write request from the host apparatus 3, which is given via the front-end package 21, based on a microprogram (not shown) stored in the local memory 37. The local memory 37 is used as the work memory of the corresponding microprocessor 36.

Moreover, the in-package shared memory 38 is a shared memory that can be accessed by the respective microprocessors 36 in the microprocessor package 23. The local access observation information 42 (FIG. 2) and the broad-range access observation information 43 (FIG. 3) described later are stored and retained in the in-package shared memory 38.

The data cache memory 24 is a large-capacity buffer memory which temporarily retains data to be transferred to and from the front-end package 21 and the back-end package 22, and is configured from a semiconductor storage element such as a DRAM (Dynamic Random Access Memory).

For example, the data to be written, which is sent together with the write request from the host apparatus 3, is stored in the data cache memory 24 via the front-end package 21, and thereafter stored (destaged) in the corresponding storage device 10 via the back-end package 22.

Moreover, when the data to be read designated in the read request from the host apparatus 3 (this is hereinafter referred to as the "read target data") exists in the data cache memory 24 (cache hit), the read target data is read from the data cache memory 24 and transferred to the host apparatus 3, which is the source of the read request, via the front-end package 21.

Meanwhile, when the read target data designated in the read request from the host apparatus 3 does not exist in the data cache memory 24 (cache-miss), the read target data is read (staged) from the storage device 10 into the data cache memory 24, and thereafter transferred to the host apparatus 3, which is the source of the read request, via the front-end package 21.

Note that the access frequency of the respective data stored in the data cache memory 24 is monitored, and, with regard to data of a low access frequency, data to be written which has not been destaged is subject to destaging, and data to be written which has been destaged or read target data which has been staged is deleted from the data cache memory 24.

(2) Sequential Learning System According to this Embodiment

The learning system of the sequential learning executed in the storage apparatus 4 is now explained. Note that, in the ensuing explanation, a group of a predetermined number of continuous logical blocks in a logical volume provided by the storage apparatus 4 to the host apparatus 3 is referred to as a "slot", and a group of a predetermined number of continuous slots (for instance, 128 continuous slots) is referred to as an "access area".

One unique feature of the storage apparatus 4 is that, upon encountering a cache-miss during read processing, the storage apparatus 4 observes (performs sequential learning of) the access pattern of the read access from the host apparatus 3 in both logical block units and slot units, and expands the data range to be staged or the prefetch range, as needed, based on the learning result of the sequential learning.

Moreover, another feature of the storage apparatus 4 is that the storage apparatus 4 shares the learning result of the sequential learning in logical block units and slot units among the respective microprocessors 36, retains the shared sequential learning result in the in-package shared memory 38, and causes the individual microprocessors 36 to update the sequential learning result.

As means for realizing this kind of sequential learning system, in this embodiment, the in-package shared memory 38 of each microprocessor package 23 of the storage apparatus 4 includes, as shown in FIG. 1, a local access observation information storage area 40, and a broad-range access observation information storage area 41.

The local access observation information storage area 40 stores the local access observation information 42 as shown in FIG. 2(A) for the number of slots that can be stored in the data cache memory 24. Moreover, the broad-range access observation information storage area 41 stores the broad-range access observation information 43 as shown in FIG. 3 for each of the formed access areas regarding a predetermined number of such access areas in which the access frequency is higher (for instance, 256 access areas).

The local access observation information 42 is 4 bytes of information that is used for observing (performing sequential learning of) the access pattern of the read access in logical block units relative to one slot worth of corresponding data stored in the data cache memory 24, and respectively stores, as shown in FIG. 2(A), learning control information 42A in the 1st byte, access count information 42B in the 2nd byte, and access back-end address information 42C in the 3rd byte and the 4th byte.

The learning control information 42A is information representing the observation result of the access pattern of the most recent read access to the corresponding slot obtained by observing the previous and current read access to that slot.

In effect, 1 byte (8 bits) of the learning control information 42A is used as follows as shown in FIG. 2(B); specifically, the 1st bit is used as a flag (this is hereinafter referred to as the "sequential flag") 42AA which represents a sequential access, the 2nd bit is used a flag (this is hereinafter referred to as the "ascending access flag") 42AB which represents an ascending access, and the 3rd bit is used as a flag (this is hereinafter referred to as the "descending access flag") 42AC which represents a descending access, respectively. Moreover, the 4th bit to the 8th bit are used as flags for managing other information, or as reserves.

When the previous and current read access to the corresponding slot is an access to continuous regions in that slot, it is determined that the current read access is a sequential access, and the sequential flag 42AA is set to "1", the ascending access flag 42AB is set to "0", and the descending access flag 42AC is set to "0", respectively.

Moreover, when the previous and current read access to the corresponding slot is an access to two non-continuous regions in that slot, and when the logical block address of the front-end logical block of the region to be accessed this time (this is hereinafter referred to as the "access front-end logical block") if greater than the logical block address of the back-end logical block of the region that was accessed last time (this is hereinafter referred to as the "access back-end logical block"), it is determined that the current access is an ascending access, and the sequential flag 42AA is set to "0", the ascending access flag 42AB is set to "1", and the descending access flag 42AC is set to "0", respectively.

Furthermore, when the previous and current read access to the corresponding slot is an access to two non-continuous regions in that slot, and when the logical block address of the previous access back-end logical block is greater than the logical block address of the current access front-end logical block, it is determined that the current access is a descending access, and the sequential lag 42AA is set to "0", the ascending access flag 42AB is set to "0", and the descending access flag 24AC is set to "1", respectively.

Moreover, the access count information 42B is information representing the access count of the corresponding slot, and is incremented (value is added one by one) each time that there is a read access to that slot. Furthermore, the access back-end address information 42C is information representing the logical block address of the access back-end logical block in the last read access to that slot.

Meanwhile, the broad-range access observation information 43 is 32 bytes of information that is used for observing the access pattern of the read access to the corresponding access area in slot units, and respectively stores, as shown in FIG. 3(A), Time of Day ("TOD") information 43A in the 1st byte and the 2nd byte, generation information 43B in the 3rd byte, access address information 43C in the 4th byte to the 9th byte, prefetch TOD information 43D in the 10th byte, prefetch slot number information 43E in the 11th byte, prefetch slot count information 43F in the 12th byte, hit count information 43G in the 13th byte, partial miss count information 43H in the 14th byte, bitmap setting count information 43I in the 15th byte, and learning result information 43J in the 16th byte, and the 17th byte to the 32nd byte are used as an access bitmap 43K.

The TOD information 43A is information which represents the lower two bytes in the byte sequence representing the time in one day (Time Of Date) measured with a timer retained in the storage apparatus 4. Moreover, the generation information 43B is information for managing the generation of entries. Because the TOD information 43A and the generation information 43B are information which are not particularly related to the present invention, the detailed explanation thereof is omitted.

The access address information 43C is information which represents the logical block address of the access back-end logical block in the last read access to the corresponding access area.

The prefetch TOD information 43D is information which represents the lower one byte in the byte sequence representing the time that the last prefetch was performed regarding the corresponding access area. Moreover, the prefetch slot number information 43E is information which represents the identifier (slot number) of the front-end slot of the region where the prefetch was performed, and the prefetch slot count information 43F is information which represents the number of slots in the access area to which the prefetch was performed.

Furthermore, the hit count information 43G is information which represents the number of cache hits (this is hereinafter referred to as the "slot hits") regarding the slots belonging to the corresponding access area, and the partial miss count information 43H is information which represents the number of read accesses to non-continuous regions in the same slot. Moreover, the bitmap setting count information 43I is information which represents the number of times that one of bits were turned ON in the access bitmap 43K described later.

The learning result information 43J is control information which represents the learning result of the sequential learning in slot units. Specifically, the learning result information 43J includes, as shown in FIG. 3(B), a sequential flag 43JA that is turned ON when a sequential access is observed in the corresponding access area in slot units, and a random access flag 43JB that is turned ON when a random access is observed in that access area in slot units.

The access bitmap 43K includes bits respectively associated with the respective slots configuring the corresponding access area. These bits are initially set to OFF ("0"), and updated to ON ("1") when there is a read access to the corresponding slot.

Note that, in this embodiment, the broad-range access observation information 43 is queue-managed in the broad-range access observation information storage area 41 (FIG. 1) of the in-package shared memory 38 (FIG. 1), and the broad-range access observation information 43 in which the access frequency to the corresponding access area is low is actively replaced by (substituted with) the broad-range access observation information 43 of another access area. It is thereby possible to manage only the broad-range access observation information 43 corresponding to access areas having a high access frequency, and efficiently perform sequential learning with a smaller memory capacity.

Figure 4:
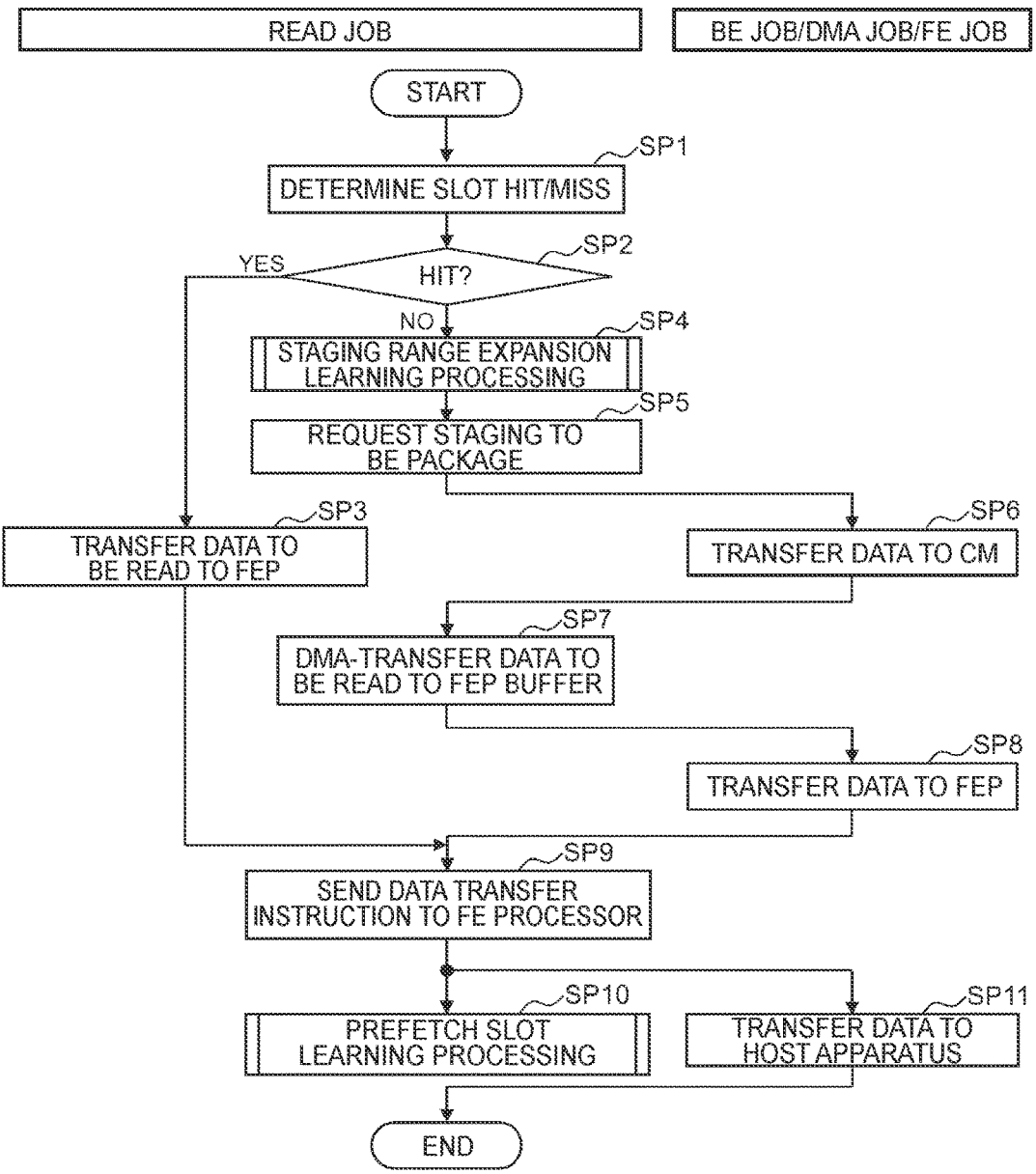
FIG. 4 is a flowchart showing the processing contents of the read processing performed in the storage apparatus according to this embodiment.

(3) Various Types of Processing Related to Sequential Learning According to this Embodiment (3-1) Read Processing FIG. 4 shows the processing routine of the series of read processing that is executed in the storage apparatus 4 when a read request is given by the host apparatus 3. The read request given to the storage apparatus 4 is assigned by the front-end package 21 (FIG. 1) to the microprocessor package 23 (FIG. 1), which is in charge of the region of the read access destination designated in the read request, within the storage apparatus 4, and additionally assigned to the microprocessor 36 with the lowest load within the microprocessor package 23.

When the microprocessor (this is hereinafter referred to as the "associated microprocessor") 36 to which the read request was assigned receives the read request, the associated microprocessor 36 starts the read job, and foremost determines whether the data of the slot (this is hereinafter referred to as the "target slot") storing the read target data designated in the read request exists in the data cache memory 24 (FIG. 1) (whether it is a slot hit) (SP1), and determines whether the determination result was a slot hit (SP2).

When the associated microprocessor 36 obtains a positive result in the foregoing determination (when it is a slot hit), the associated microprocessor 36 reads the read target data from the data cache memory 24, and transfers the read target data to the front-end package 21 (SP3). The associated microprocessor 36 thereafter proceeds to step SP9.

Meanwhile, when the associated microprocessor 36 obtains a negative result in the determination of step SP2 (when it is a cache-miss), the associated microprocessor 36 observes the access pattern of the read access to the target slot in logical block units and slot units, respectively, and then executes the staging range expansion learning processing of expanding, as needed, the range (staging range) of staging the data in the target slot (SP4).

Moreover, the associated microprocessor thereafter sends a request (this is hereinafter referred to as the "staging request") to the back-end processor 34 (FIG. 1) of the back-end package 22 (FIG. 1) to the effect that the read target data should be staged (SP5).

Consequently, the back-end processor 34 of the back-end package 22 that received the staging request executes the back-end job (BE job), reads the requested read target data from the back-end data transfer buffer 35 (FIG. 1) of the corresponding storage device 10 (FIG. 1), and transfers the read target data to the corresponding data cache memory 24 (SP6). The read target data is thereby staged in the data cache memory 24.

Subsequently, the associated microprocessor 36 activates the DMA (Direct Memory Access) job, and instructs the DMA job to DMA-transfer the read target data, which was staged in the data cache memory 24, to the front-end data transfer buffer 32 of the front-end package 21 (SP7).

Consequently, the read target data, which was staged in the data cache memory 24, is DMA-transferred to the front-end data transfer buffer 32 of the front-end package 21 by the DMA job (SP8).

Next, the associated microprocessor 36 sends a data transfer instruction to the front-end processor 31 of the front-end package 21 to transfer the read target data (SP9), and thereafter executes the prefetch slot learning processing for determining the data range (slot units) to be prefetched (SP10). In effect, the associated microprocessor 36 performs, in step SP10, by observing the access pattern of the read access, in slot units, in the access area to which the target slot belongs (this is hereinafter referred to as the "target access area"), the sequential learning of the target access area in slot units, and determines the data range to be prefetched based on the learning result of the sequential learning.

Moreover, the front-end processor 31 that received the data transfer instruction executes the front-end job (FE job), and sends the read target data stored in the front-end data transfer buffer 32 to the host apparatus, which is the source of the read request (SP11). The series of read processing is thereby ended.

Note that, when the read target data designated in the read request is stored across a plurality of slots (that is, when the data length of the read target data corresponds to a plurality of slots), the processing of step SP1 to step SP11 is executed for each slot storing the read target data.

(3-2) Staging Range Expansion Learning Processing

Figure 5:
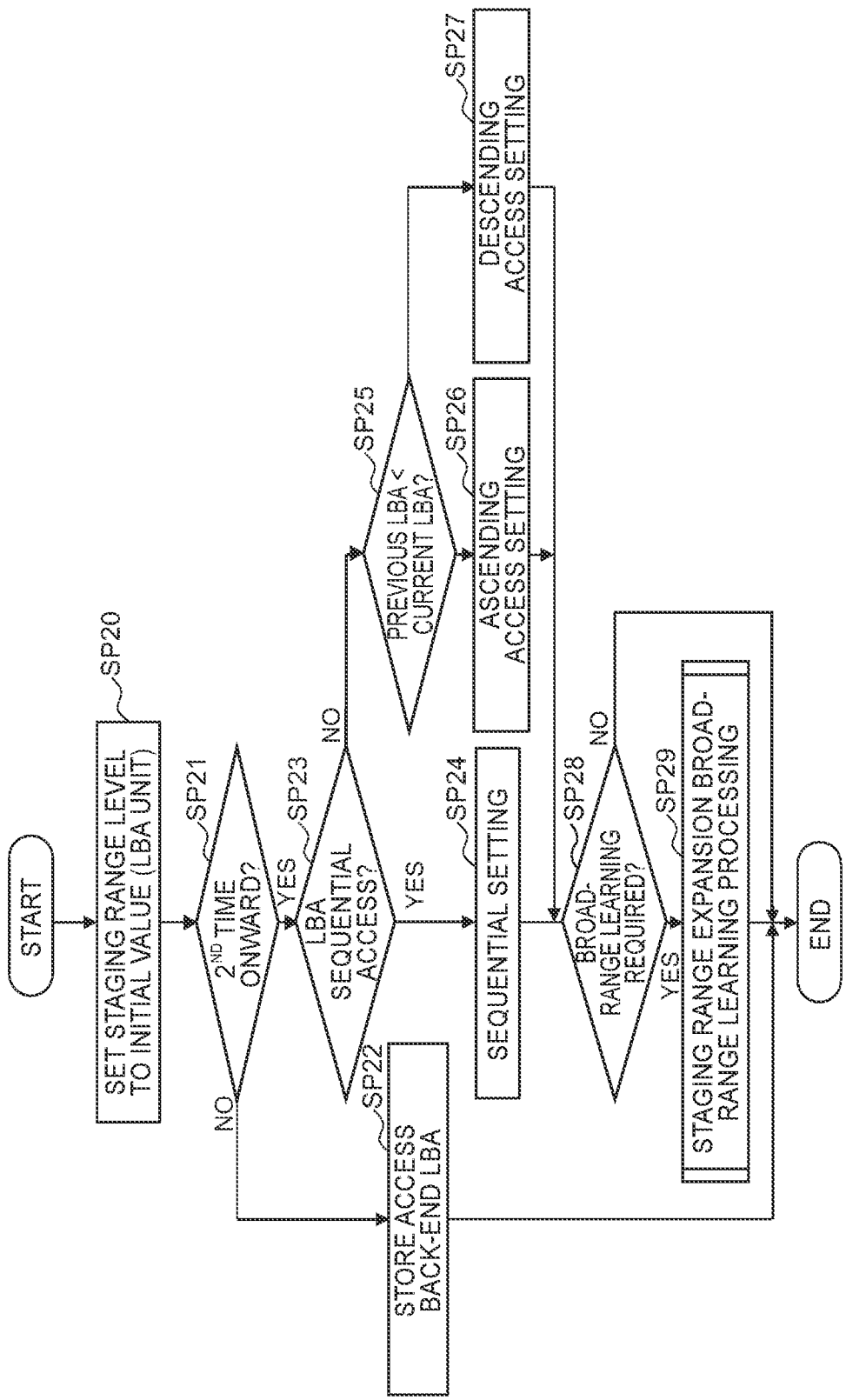
FIG. 5 is a flowchart showing the processing routine of the staging range expansion learning processing.

FIG. 5 shows the specific processing contents of the staging range expansion learning processing to be executed by the associated microprocessor 36 in step SP4 of the read processing described above with reference to FIG. 4.

When the associated microprocessor 36 proceeds to step SP4 of the read processing, the associated microprocessor 36 starts the staging range expansion learning processing shown in FIG. 5, and foremost sets the staging range level, which represents the range upon staging the read target data, to the initial value of "logical block address units" (SP20).

Subsequently, the associated microprocessor 36 determines whether the read access to the target slot is an access that is the second access onward based on the access count information 42B (FIG. 2) of the local access observation information 42 (FIG. 2) corresponding to that target slot (SP21).

To obtain a negative result in the foregoing determination means that the learning of the access pattern to the target slot to be executed in subsequent step SP23 to step SP27 cannot be performed. Consequently, here, the associated microprocessor 36 stores the logical block address of the access back-end logical block in that target slot as the access back-end address information 42C (FIG. 2) in the 3rd byte and the 4th byte of the local access observation information 42 (FIG. 2) corresponding to that target slot stored in the in-package shared memory 38 (SP22), and thereafter ends the staging range expansion learning processing.

Meanwhile, to obtain a positive result in the determination of step SP21 means that the current read access to that target slot is a read access that is the second read access onward, and that the learning of the access pattern to the target slot to be executed in step SP23 to step SP27 can be performed.

Consequently, here, the associated microprocessor 36 determines whether the logical block address of the access back-end logical block in the previous read access to the target slot stored in the 3rd byte and the 4th byte of the local access observation information 42 corresponding to that target slot and the logical block address of the access front-end logical block in the current read access to the target slot are continuous (SP23).

When the associated microprocessor 36 obtains a positive result in the foregoing determination, the associated microprocessor 36 determines that the access pattern of the read access to that target slot is sequential, and sets the sequential flag 42AA, the ascending access flag 42AB, and the descending access flag 42AC of the learning control information 42A (FIG. 2) of the local access observation information 42 corresponding to that target slot to "1", "0", and "0", respectively.

Meanwhile, when the associated microprocessor 36 obtains a negative result in the determination of step SP23, the associated microprocessor 36 determines whether the value of the logical block address of the access back-end logical block in the previous read access to the target slot stored in the 3rd byte and the 4th byte of the local access observation information 42 corresponding to that target slot is smaller than the value of the logical block address of the access front-end logical block in the current read access to the target slot (SP25).

When the associated microprocessor 36 obtains a positive result in the foregoing determination, the associated microprocessor 36 determines that the access pattern of the read access to that target slot is an ascending access, and sets the sequential flag 42AA, the ascending access flag 42AB, and the descending access flag 42AC of the learning control information 42A (FIG. 2) of the local access observation information 42 corresponding to that target slot to "0", "1", and "0", respectively (SP26).

Meanwhile, when the associated microprocessor 36 obtains a positive result in the determination of step SP25, the associated microprocessor 36 determines that the access pattern of the read access to that target slot is a descending access, and sets the sequential flag 42AA, the ascending access flag 42AB, and the descending access flag 42AC of the learning control information 42A (FIG. 2) of the local access observation information 42 corresponding to that target slot to "0", "0", and "1", respectively (SP27).

When the associated microprocessor 36 completes the processing in step SP24, step SP26 or step SP27, the associated microprocessor 36 determines whether to execute the observation of the access pattern of the read access in the access area in slot units (this is hereinafter referred to as the "staging range expansion broad-range learning") (SP28). This determination is made by referring to the learning control information 42A of the local access observation information 42 corresponding to that target slot, and determining whether the access pattern of the read access to that target slot is an ascending access or a descending access.

When the associated microprocessor 36 obtains a negative result in the determination of step SP28 (when the access pattern to that target slot was not an ascending access or a descending access), the associated microprocessor 36 ends the staging range expansion learning processing.

Meanwhile, when the associated microprocessor 36 obtains a positive result in the determination of step SP28 (when the access pattern to that target slot was an ascending access or a descending access), the associated microprocessor 36 executes the staging range expansion broad-range learning processing (performing sequential learning in slot units of) the access pattern of the read pattern in the access area (target access area), to which the target slot belongs, in slot units (SP29), and thereafter ends the staging range expansion learning processing.

(3-3) Staging Range Expansion Broad-Range Learning Processing

Figure 6:
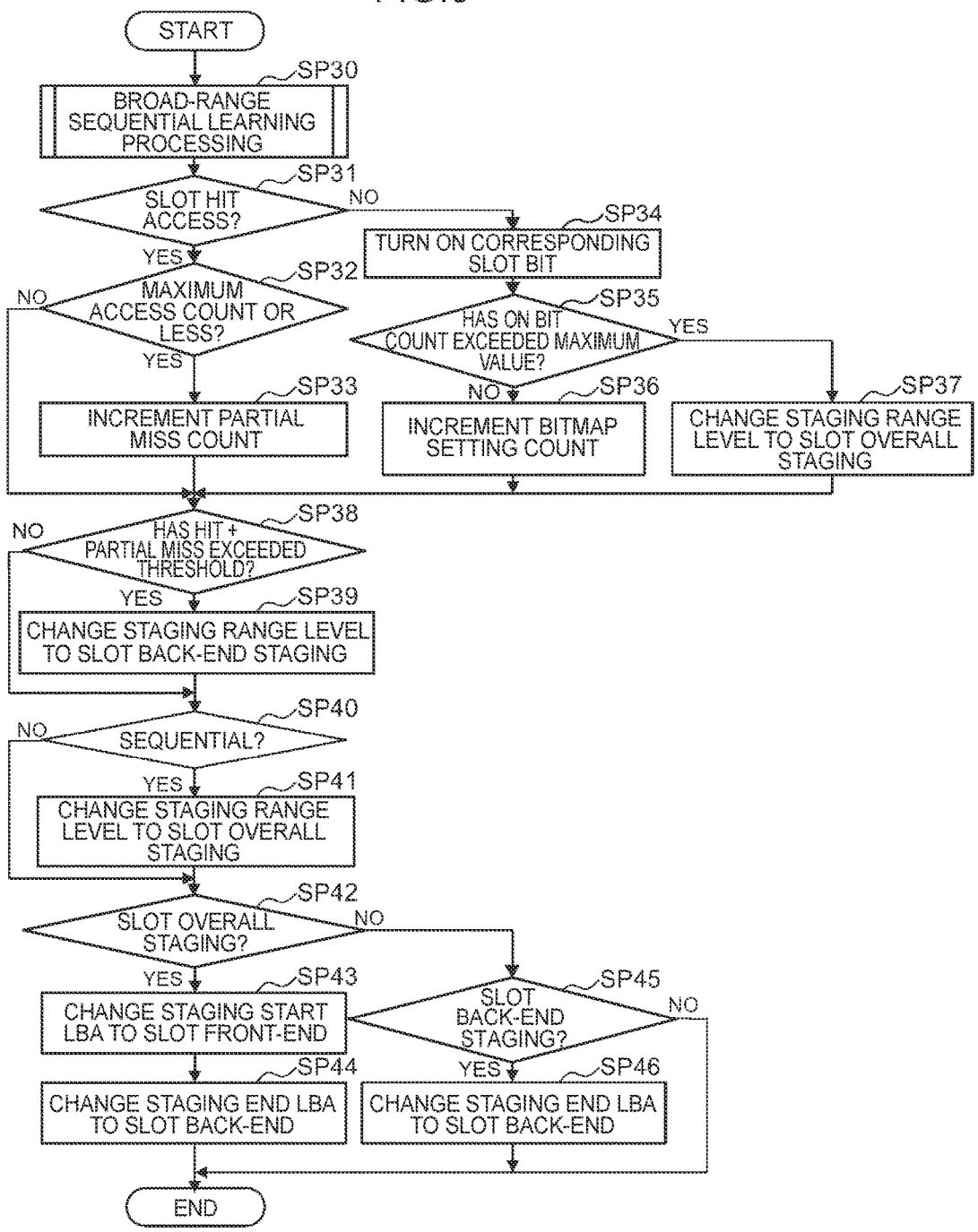
FIG. 6 is a flowchart showing the processing routine of the staging range expansion broad-range learning processing.

FIG. 6 shows the specific processing contents of the staging range expansion broad-range learning processing to be executed by the associated microprocessor 36 in step SP29 of the staging range expansion learning processing described above with reference to FIG. 5.

When the associated microprocessor 36 proceeds to step SP29 of the staging range expansion learning processing, the associated microprocessor 36 starts the staging range expansion broad-range learning processing shown in FIG. 6, and foremost executes the broad-range sequential learning processing of learning the continuity of the access destination of the read access in the access area (target access area), to which the target slot belongs, in slot units (SP30). As described later, based on the broad-range sequential learning processing, the associated microprocessor 36 learns whether the read access to the target access area is sequential or random in terms of slot units, and stores the learning result as the learning result information 43J (FIG. 3) in the 16th byte of the broad-range access observation information 43 (FIG. 3) corresponding to that target access area.

Subsequently, the associated microprocessor 36 refers to the broad-range access observation information 43 of the target access area, and determines whether data having the same LBA as the access destination of the current read access in the target slot is cached in the data cache memory 24 (SP31). This determination is made by determining whether the bit corresponding to the target slot in the access bitmap 43K (FIG. 3), which is stored in the 17th byte to the 32nd byte of the broad-range access observation information 43 of the target access area, is ON ("1"). When the corresponding bit is ON, a positive result is obtained in step SP31, and, when the corresponding bit is OFF ("0"), a negative result is obtained in step SP31.

Consequently, when the associated microprocessor 36 obtains a positive result in the determination of step SP31, the associated microprocessor 36 determines whether the value of the partial miss count information 43H stored in the 14th byte of the broad-range access observation information 43 of the target access area is equal to or less than the number of slots (128) in the target access area (SP32). When the associated microprocessor 36 obtains a negative result in the foregoing determination, the associated microprocessor 36 proceeds to step SP38. Meanwhile, when the associated microprocessor 36 obtains a positive result in the foregoing determination, the associated microprocessor 36 increments the value of the partial miss count information 34H of the broad-range access observation information 43 of the target access area.

Meanwhile, when the associated microprocessor 36 obtains a negative result in the determination of step SP31, the associated microprocessor 36 sets the bit corresponding to the target slot to ON among the bits configuring the access bitmap 43K stored in the 17th byte to the 32nd byte of the broad-range access observation information 43 of that target access area (SP34).

Subsequently, the associated microprocessor 36 determines whether the value of the bitmap setting count information 43I (FIG. 3) stored in the 15th byte of the broad-range access observation information 43 of the target access area has exceeded a pre-set maximum number of access bitmaps (SP35). Note that the maximum number of access bitmaps is set to a value (for instance, 118) that is smaller than the number of slots (128) in the target access area.

To obtain a negative result in the foregoing determination means that the read access to the target access area is not that concentrated. Consequently, here, the associated microprocessor 36 increments the value of the bitmap setting count information 43I stored in the 15th byte of the broad-range access observation information 43 of the target access area (SP36).

Meanwhile, to obtain a positive result in the determination of step SP35 means that the read access to the target access area is somewhat concentrated. Consequently, here, the associated microprocessor 36 changes the staging range level in the target slot to "target slot overall staging" (SP37).

When the associated microprocessor 36 completes the processing of step SP33, step SP36 or step SP37, the associated microprocessor 36 determines whether a total value of the value of the hit count information 43G (FIG. 3) stored in the 13th byte of the broad-range access observation information 43 of the target access area and the value of the partial miss count information 43H (FIG. 3) stored in the 14th byte of the broad-range access observation information 43 exceeds a pre-set threshold (SP38).

To obtain a negative result in the foregoing determination means that a non-sequential read access to the target slot is not that concentrated. Consequently, here, the associated microprocessor 36 proceeds to step SP40.

Meanwhile, to obtain a positive result in the determination of step SP38 means that a non-sequential read access to the target slot is concentrated. Consequently, here, the associated microprocessor 36 changes the staging range level of the target slot to "slot block-end staging" in which the staging range is from the access front-end logical block to the back-end logical block of that target slot (SP39).

Next, the associated microprocessor 36 refers to the learning result information 43J (FIG. 3) stored in the 16th byte of the broad-range access observation information 43 of the target access area, and determines whether the sequential flag 43JA is set to ON (SP40).

To obtain a negative result in the foregoing determination means that a sequential read access is not being made in the target access area in terms of slot units. Consequently, here, the associated microprocessor 36 proceeds to step SP42.

Meanwhile, to obtain a positive result in the determination step SP40 means that a sequential read access is being made in the target access area in terms of slot units. Consequently, here, the associated microprocessor 36 changes the staging range level of the target slot to "slot overall staging" (SP41).

Thereafter, the associated microprocessor 36 determines whether the staging range level that is currently set for the target slot is "slot overall staging" (SP42). When the associated microprocessor 36 obtains a positive result in the foregoing determination, the associated microprocessor 36 changes the logical block address of the logical block in the target slot from which the staging is to be started to the logical block address of the front-end logical block of that target slot (SP43), and additionally changes the logical block address of the last logical block at which the staging should be ended to the logical block address of the back-end logical block of that target slot (SP44). The associated microprocessor 36 thereafter ends the staging range expansion broad-range learning processing.

Meanwhile, when the associated microprocessor 36 obtains a negative result in the determination of step SP42, the associated microprocessor 36 determines whether the stating range level that is currently set for the target slot is "slot block-end staging" (SP45). When the associated microprocessor 36 obtains a negative result in the foregoing determination, the associated microprocessor 36 ends the staging range expansion broad-range learning processing.

Meanwhile, when the associated microprocessor 36 obtains a positive result in the determination of step SP45, the associated microprocessor 36 changes the logical block address of the last logical block in the target slot at which the staging should be ended to the logical block address of the back-end logical block of the target slot (SP46). The associated microprocessor 36 thereafter ends the staging range expansion broad-range learning processing.

(3-4) Broad-Range Sequential Learning Processing

Figure 7:
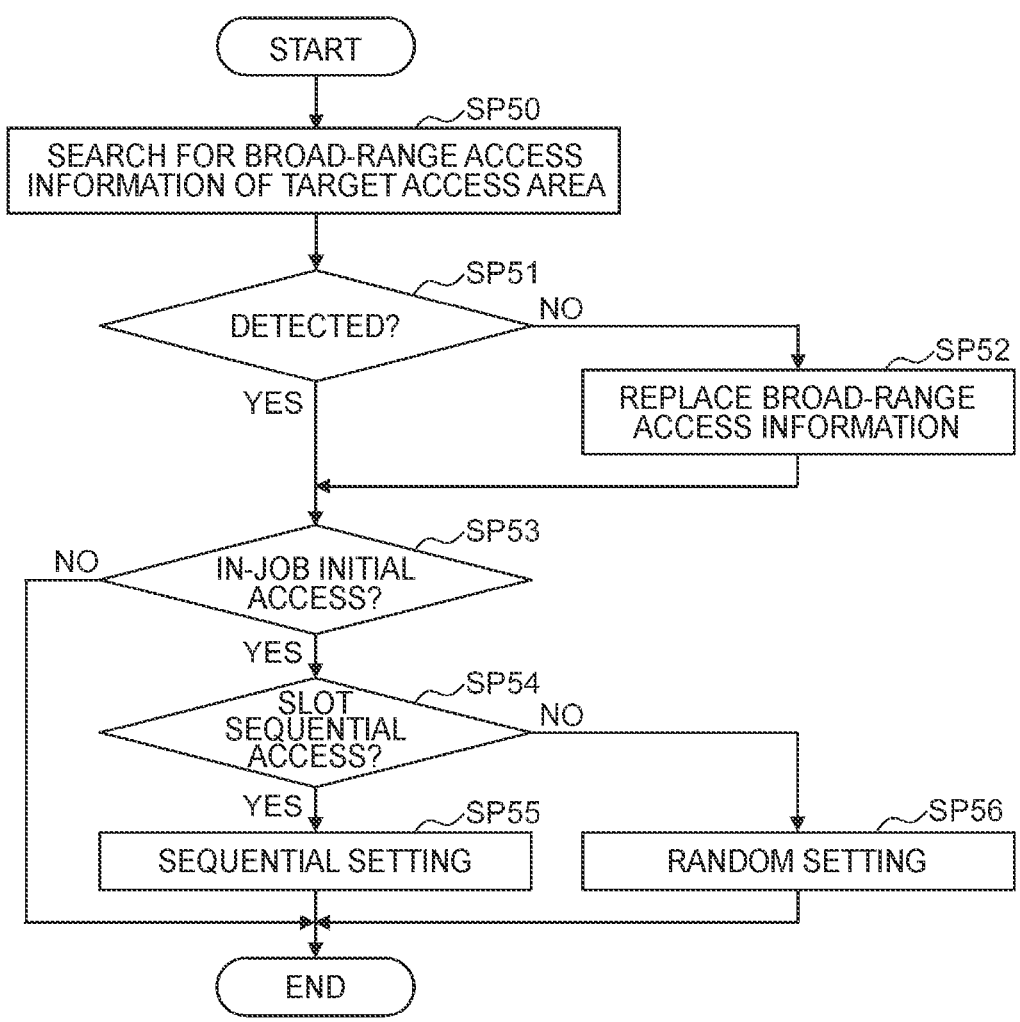
FIG. 7 is a flowchart showing the processing routine of the broad-range sequential learning processing.

FIG. 7 shows the specific processing contents of the broad-range sequential learning processing to be executed by the associated microprocessor 36 in step SP30 of the staging range expansion broad-range learning processing described above with reference to FIG. 6.

When the associated microprocessor 36 proceeds to step SP30 of the staging range expansion broad-range learning processing, the associated microprocessor 36 starts the broad-range sequential learning processing shown in FIG. 7, and foremost searches for the broad-range access observation information 43 of the target access area in the broad-range access observation information storage area 41 (FIG. 1) of the in-package shared memory 38 (FIG. 1) (SP50).

The associated microprocessor 36 determines whether the broad-range access observation information 43 of the target access area was detected based on the foregoing search (SP51), and proceeds to step SP53 upon obtaining a positive result. Meanwhile, when the associated microprocessor 36 obtains a negative result in the determination of step SP51, the associated microprocessor 36 replaces the broad-range access observation information corresponding to the access area with the lowest access frequency in the retained broad-range access observation information 43 with the broad-range access observation information 43 of the target access area (SP52).

Subsequently, the associated microprocessor 36 determines whether it is the initial read access to the target access area in the read job activated based on the current read request (that is, whether the target slot is the first slot in the target access area to be read (accessed) based on the read request) (SP53). When the associated microprocessor 36 obtains a negative result in the foregoing determination, the associated microprocessor 36 ends the broad-range sequential learning processing.

Meanwhile, when the associated microprocessor 36 obtains a positive result in the determination of step SP53, the associated microprocessor 36 refers to the access bitmap 43K (FIG. 3) stored in the 17th byte to the 32nd byte of the broad-range access observation information 43 of the target access area, and determines whether both the bit of the target slot and the bit of the previous slot are set to ON, and whether the access back-end logical block in the previous read access is the back-end logical block of a slot that is one before the target slot and the access front-end logical block in the current read access is the front-end logical block address of the target slot (SP54).

When a positive result is obtained in the foregoing determination, it is possible to deduce that the access pattern to the target access area, in terms of slot units, is a sequential access. Consequently, here, the associated microprocessor 36 sets the sequential flag 43JA (FIG. 3) of the learning result information 43J stored in the 16th byte of the broad-range access observation information 43 of the target access area to ON, and additionally sets the random access flag 43JB (FIG. 3) of the learning result information 43J to OFF (SP55).

Meanwhile, when a negative result is obtained in the determination of step SP54, it is possible to deduce that the access pattern to the target access area, in terms of slot units, is a random access. Consequently, here, the associated microprocessor 36 sets the sequential flag 43JA (FIG. 3) of the learning result information 43J stored in the 16th byte of the broad-range access observation information 43 of the target access area to OFF, and additionally sets the random access flag 43JB of the learning result information 43J to ON (SP56).

The associated microprocessor 36 thereafter ends the broad-range sequential learning processing.

Based on the series of processing described above, the staging range of the target slot at such point in time is determined, and the staging of necessary data is executed in step SP5 and step SP6 of the read processing described above with reference to FIG. 4 is executed based on the determination result.

(3-5) Prefetch Slot Learning Processing

Figure 8:
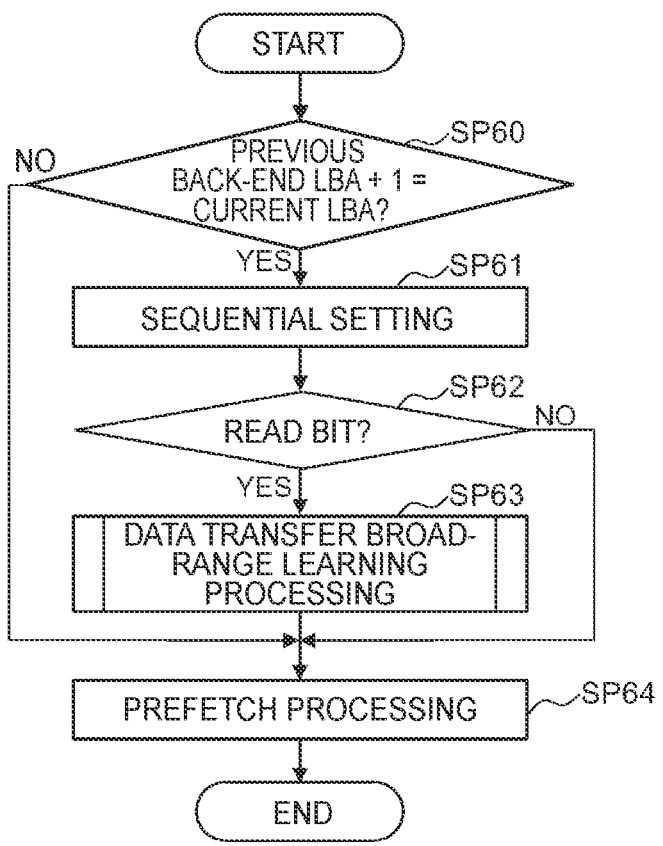
FIG. 8 is a flowchart showing the processing routine of the prefetch slot determination processing.

Meanwhile, FIG. 8 shows the specific processing contents of the prefetch slot learning processing to be executed by the associated microprocessor 36 in step SP10 of the read processing described above with reference to FIG. 4. With the storage apparatus 4 of this embodiment, because the prefetch is only performed in slot units, the content of learning will only be the continuity of the read access in slot units.

When the associated microprocessor 36 proceeds to step SP10 of the read processing, the associated microprocessor 36 starts the prefetch slot learning processing shown in FIG. 8, and foremost determines whether the value obtained by adding one to the logical block address of the access back-end logical block in the previous read access coincides with the logical block address of the access front-end logical block in the current read access (SP60).

When the associated microprocessor 36 obtains a negative result in the foregoing determination, the associated microprocessor 36 ends the prefetch slot determination processing.

Meanwhile, when the associated microprocessor 36 obtains a positive result in the determination of step SP60, the associated microprocessor 36 sets the learning control information 42A stored in the 1st byte of the local access observation information 42 (FIG. 2) of the target slot to sequential, and also sets the learning result information 43J (FIG. 3) stored in the 16th byte of the broad-range access observation information 43 of the target access area to sequential (SP61).

Specifically, in step SP61, the associated microprocessor 36 sets the sequential flag 42AA (FIG. 2) to ON, and sets the ascending access flag 42AB (FIG. 2) and the descending access flag 42AC (FIG. 2) to OFF, respectively, regarding the learning control information 42A in the local access observation information 42 of the target slot. Moreover, the associated microprocessor 36 sets the sequential flag 43JA (FIG. 3) to ON and sets the random access flag 43JB (FIG. 3) to OFF regarding the learning result information 43J in the broad-range access observation information of the target access area.

Subsequently, the associated microprocessor 36 determines whether the data of the target slot exists in the data cache memory 24 (SP62).

To obtain a negative result in the foregoing determination means that, because a negative result was similarly obtained in step SP2 of the read processing described above with reference to FIG. 4, the access pattern of the read access to the target slot and the target access area has already been observed in step SP4 of the read processing regarding that target slot (sequential learning in logical block units and slot units is complete). Consequently, here, the associated microprocessor 36 ends the prefetch slot determination processing.

Meanwhile, to obtain a positive result in the determination of step SP62 means that, because a positive result was similarly obtained in step SP2 of the read processing, the learning of the access pattern of the read access to that target slot has not yet been performed, and the setting of the staging range to that target slot has also not yet been made. Consequently, here, the associated microprocessor 36 executes the data transfer broad-range learning processing of learning the continuity of the read access in the target access area in slot units (SP63).

Next, the associated microprocessor 36 executes the prefetch processing of prefetching data by using the local access observation information 42 of the corresponding slot and the corresponding broad-range access observation information 43 (SP64). For example, the associated microprocessor 36 broadens the data range to be prefetched when it is determined that the read access to the target slot is sequential based on the local access observation information 42, and further broadens the data range to be prefetched when it is determined that the access in the target access area in slot units is a sequential access based on the broad-range access observation information 43. The associated microprocessor 36 thereafter ends the prefetch slot determination processing.

(3-6) Data Transfer Broad-Range Learning Processing

Figure 9:
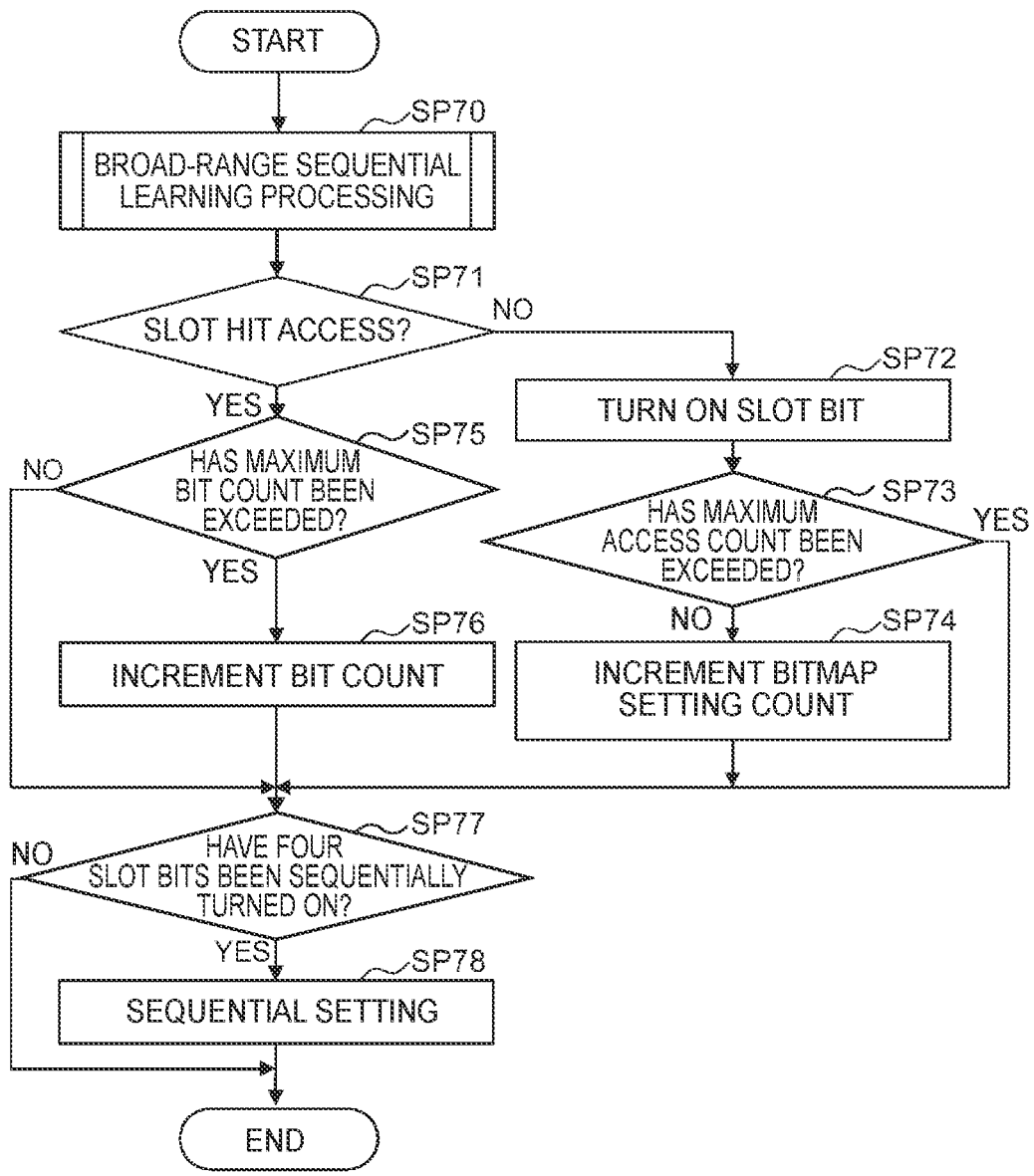
FIG. 9 is a flowchart showing the processing routine of the data transfer broad-range learning processing.

FIG. 9 shows the specific processing contents of the data transfer broad-range learning processing to be executed by the associated microprocessor 36 in step SP63 of the prefetch slot learning processing described above with reference to FIG. 8.

When the associated microprocessor 36 proceeds to step SP63 of the prefetch slot learning processing, the associated microprocessor 36 starts the data transfer broad-range learning processing shown in FIG. 9, and foremost learns the continuity of the access destination of the read access in the target access are in slot units by executing the broad-range sequential learning processing described above with reference to FIG. 7 (SP70).

Subsequently, the associated microprocessor 36 determines whether there was previously a read access to a region that is not continuous to the access destination of the current read access in the target slot in the same manner as step SP31 of the staging range expansion broad-range learning processing described above with reference to FIG. 6. (SP71).

When the associated microprocessor 36 obtains a negative result in the foregoing determination, the associated microprocessor 36 processes step SP72 and step SP73 in the same manner as step SP34 and step SP35 of FIG. 6. When the associated microprocessor 36 obtains a positive result in the determination of step SP73, the associated microprocessor 36 proceeds to step SP77.

Moreover, when the associated microprocessor 36 obtains a negative result in the determination of step SP73, the associated microprocessor 36 increments the value of the bitmap setting count information 43I stored in the 15th byte of the broad-range access observation information 43 of the target access area (SP74). The associated microprocessor 36 thereafter proceeds to step SP77.

Meanwhile, when the associated microprocessor 36 obtains a positive result in the determination of step SP71, the associated microprocessor 36 determines whether the hit count stored in the 13th byte of the target broad-range access observation information has exceeded the number of slots (128) in the target access area (SP75). The associated microprocessor 36 proceeds to step SP77 upon obtaining a negative result in the foregoing determination. Meanwhile, when the associated microprocessor 36 obtains a positive result in the foregoing determination, associated microprocessor 36 increments the hit count (SP76) of the broad-range access observation information 43 of the target access area.

Next, the associated microprocessor 36 refers to the access bitmap 43K (FIG. 3) stored in the 17th byte to the 32nd byte of the broad-range access observation information 43 of the target access area, and determines whether the bits respectively corresponding to any of the continuous four slots are all set to ON (SP77). When the associated microprocessor 36 obtains a negative result in the foregoing determination, the associated microprocessor 36 ends the data transfer broad-range learning processing.

Meanwhile, when the associated microprocessor 36 obtains a positive result in the determination of step SP77, the associated microprocessor 36 sets the sequential flag 43JA (FIG. 3) of the learning result information 43J (FIG. 3) stored in the 16th byte of the broad-range access observation information 43 of the target access area to ON (SP78), and thereafter ends the data transfer broad-range learning processing.

(4) Effect of this Embodiment

As described above, when the storage apparatus 4 of this embodiment encounters a cache-miss, the storage apparatus 4 performs sequential learning in logical block units and sequential learning in slot units, and expands the staging range and the prefetch range, as needed, based on the learning result.

Thus, according to the storage apparatus 4, because staging and prefetch of an appropriate data range can be efficiently performed also for access patterns such as an ascending access and a descending access in addition to a sequential access, the response performance to the read access can be improved.

Moreover, with the storage apparatus 4, because the tiered learning information of the access pattern of the read access is stored and managed in the in-package shared memory 38 that is shared by all microprocessors 36 in the microprocessor package 23, learning can be completed more promptly in comparison to cases where each microprocessor 36 independently performs such learning. Thus, according to the storage apparatus 4, in addition to being able to perform sequential learning efficiently, the response performance to the read access can be further improved.

Furthermore, with the storage apparatus 4, because the broad-range access observation information 43 is subject to queue management and the broad-range access observation information 43 in which the access frequency to the corresponding access area is low is suitably replaced with the broad-range access observation information 43 corresponding to a new access area, the broad-range access observation information 43 can be efficiently managed with a smaller memory capacity, and sequential learning can also be efficiently performed.

(5) Other Embodiments

Note that, while the embodiment described above explained a case of configuring the storage apparatus 4 as shown in FIG. 1, the present invention is not limited thereto, and the storage apparatus 4 may broadly adopt various other configurations so as long as the storage device 10 includes a buffer memory which temporarily retains data to be read/written.

Moreover, while the embodiment described above explained a case where, in step SP77 of the data transfer broad-range learning processing described above with reference to FIG. 9, a sequential access is determined and a sequential setting is made when the bits respectively corresponding to any of the continuous four slots in the access bitmap 43K (FIG. 3) stored in the 17th byte to the 32nd byte of the broad-range access observation information 43 of the target access area are all set to ON, the present invention is not limited thereto, and a sequential access may be determined and a sequential setting may be made when the bits respectively correspond to any of the continuous two or three slots in the access bitmap 43K are all set to ON, or when the bits respectively corresponding to a predetermined number of slots (five or more slots) are all set to ON.

Furthermore, while the embodiment described above explained a case of configuring the access area with 128 slots, the present invention is not limited thereto, and the access area may also be configured from slots in a quantity other than 128 slots.

Figure 2:
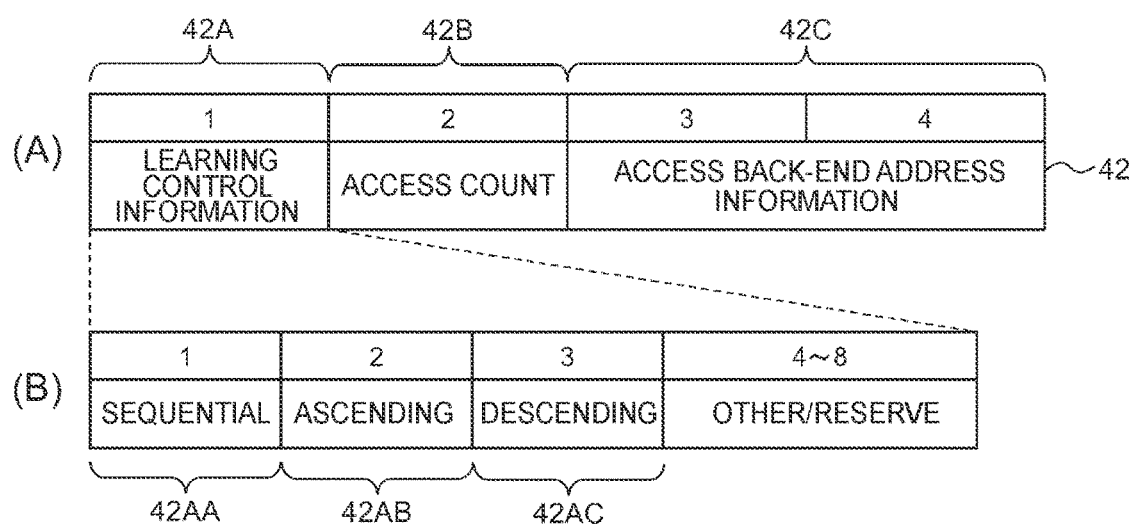
FIG. 2(A) is a conceptual diagram showing a configuration of the local access observation information.
FIG. 2(B) is a conceptual diagram showing a schematic configuration of the learning control information.
Figure 3:
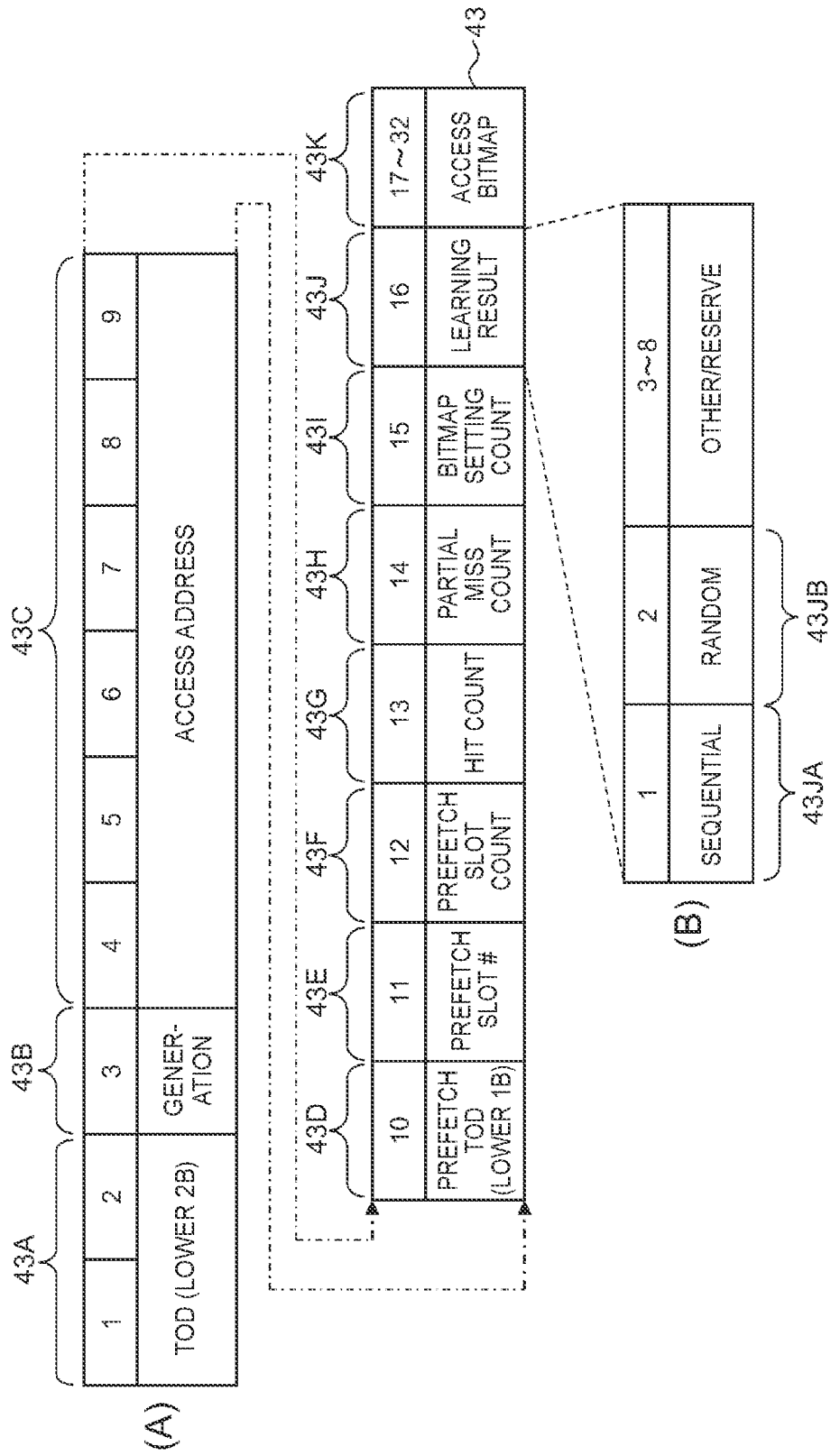
FIG. 3(A) is a conceptual diagram showing a configuration of the broad-range access observation information.
FIG. 3(B) is a conceptual diagram showing a schematic configuration of the learning result information.

Furthermore, while the embodiment described above explained a case of configuring the local access observation information 42 as shown in FIG. 2 and configuring the broad-range access observation information 43 as shown in FIG. 3, the present invention is not limited thereto, and the local access observation information 42 and the broad-range access observation information 43 may broadly adopt various other configurations.

INDUSTRIAL APPLICABILITY

The present invention can be broadly applied to storage apparatuses of various configurations including a buffer memory for temporarily storing data to be read from and written into a storage device.

REFERENCE SIGNS LIST

1 . . . information processing system, 3 . . . host apparatus, 4 . . . storage apparatus, 21 . . . front-end package, 22 . . . back-end package, 23 . . . microprocessor package, 24 . . . data cache memory, 36 . . . microprocessor, 37 . . . local memory, 38 . . . in-package shared memory, 42 . . . local access observation information, 43 . . . broad-range access observation information.

The invention claimed is:

1. A storage apparatus which provides, to a host apparatus, a storage area for reading or writing data, comprising:
one or more storage devices which provide the storage area;
a plurality of processors, each of which reads data to be read from the storage area according to a read request given from the host apparatus; and
a data buffer memory which temporarily retains the data read from the storage area,
wherein each processor of the plurality of processors:
when the data to be read is not retained in the data buffer memory, executes staging of reading the data to be read from the storage area into the data buffer memory, and sends the staged data to be read to the host apparatus; and
upon staging the data to be read, performs sequential learning of respectively observing an access pattern in units of blocks of a predetermined size and an access pattern in units of slots configured from a plurality of the blocks regarding an access pattern of the read access from the host apparatus, and expands a data range to be staged as needed based on a learning result of the sequential learning; and
wherein each processor shares first access observation information as a learning result of the sequential learning in units of the blocks and second access observation information as a learning result of the sequential learning in units of the slots, updates the first access observation information based on the learning result of the sequential learning in units of the blocks, and updates the second access observation information based on the learning result of the sequential learning in units of the slots.

2. The storage apparatus according to claim 1,
wherein each processor expands the data range to be staged upon detecting, as the access pattern of the read access, continuity of an access destination of the read access in the block units or the slot units.

3. The storage apparatus according to claim 2,
wherein each processor:
learns, for each access area configured from a plurality of the slots, an access pattern of the read access to the access area in units of the slots; and
even when continuity of an access destination of the read access in the block units or the slot units could not be detected as the access pattern of the read access, expands the data range to be staged when a count of the read access to the access area exceeds a threshold.

4. The storage apparatus according to claim 3,
wherein each processor expands the data range to be staged to all of the corresponding slots, or to a back-end block of the corresponding slot, based on a learning result of the sequential learning in units of the blocks and a learning result of the sequential learning in units of the slots.

5. The storage apparatus according to claim 1,
wherein the first access observation information is local access observation information and the learning result of the sequential learning in units of the slots comprises observation result of the access pattern of a most recent read access to a corresponding slot obtained by observing a previous read access and a current read access to the corresponding slot.

6. The storage apparatus according to claim 1, further comprising:
a shared memory which is shared by each of the processors,
wherein the first access observation information and the second access observation information are stored in the shared memory.

7. The storage apparatus according to claim 1,
wherein each of the processors:
shares the second access observation information of a predetermined number of the access areas in which a count of the read access is high among the access areas configured from a plurality of the slots; and
when the read access is designating the access area without the second access observation information as an access destination, replaces the second access observation information corresponding to the access area with a lowest access count among the second access observation information with the second access observation information corresponding to the access area of the access destination of the read access.

8. The storage apparatus according to claim 5,
wherein the second access observation information is broad-range access observation information to be used for observing the access pattern of the read access to the corresponding access area in the slot units.

9. A control method of a storage apparatus which provides, to a host apparatus, a storage area for reading or writing data,
wherein the storage apparatus includes:
one or more storage devices which provide the storage area;
plurality of processors each of which reads data to be read from the storage area according to a read request given from the host apparatus; and
a data buffer memory which temporarily retains the data read from the storage area,
wherein the control method comprises:
a first step of each processor of the plurality of processors, when the data to be read is not retained in the data buffer memory, executing staging of reading the data to be read from the storage area into the data buffer memory, sending the staged data to be read to the host apparatus, and, upon staging the data to be read, performing sequential learning of respectively observing an access pattern in units of blocks of a predetermined size and an access pattern in units of slots configured from a plurality of the blocks regarding an access pattern of the read access from the host apparatus; and a second step of each processor expanding a data range to be staged as needed based on a learning result of the sequential learning; and wherein, in the first step, each of the processors shares first access observation information as a learning result of the sequential learning in units of the blocks and second access observation information as a learning result of the sequential learning in units of the slots, updates the first access observation information based on the learning result of the sequential learning in units of the blocks, and updates the second access observation information based on the learning result of the sequential learning in units of the slots.

10. The control method of a storage apparatus according to claim 9, wherein, in the second step, each processor expands the data range to be staged upon detecting, as the access pattern of the read access, continuity of an access destination of the read access in the block units or the slot units.

11. The control method of a storage apparatus according to claim 10, wherein, in the first step, each processor learns, for each access area configured from a plurality of the slots, an access pattern of the read access to the access area in units of the slots; and wherein, in the second step, each processor, even when continuity of an access destination of the read access in the block units or the slot units could not be detected as the access pattern of the read access, expands the data range to be staged when a count of the read access to the access area exceeds a threshold.

12. The control method of a storage apparatus according to claim 11, wherein, in the second step, each processor expands the data range to be staged to all of the corresponding slots, or to a back-end block of the corresponding slot, based on a learning result of the sequential learning in units of the blocks and a learning result of the sequential learning in units of the slots.

13. The control method of a storage apparatus according to claim 9, wherein the storage apparatus further includes a shared memory which is shared by each of the processors, and wherein the first access observation information and the second access observation information are stored in the shared memory.

14. The control method of a storage apparatus according to claim 9, wherein each of the processors shares the second access observation information of a predetermined number of the access areas in which a count of the read access is high among the access areas configured from a plurality of the slots; and wherein, in the first step, each of the processors, when the read access is designating the access area without the second access observation information as an access destination, replaces the second access observation information corresponding to the access area with a lowest access count among the second access observation information with the second access observation information corresponding to the access area of the access destination of the read access.

15. The control method of a storage apparatus according to claim 9, wherein the first access observation information is local access observation information and the learning result of the sequential learning in units of the slots comprises observation result of the access pattern of a most recent read access to a corresponding slot obtained by observing a previous read access and a current read access to the corresponding slot.

16. The control method of a storage apparatus according to claim 15, wherein the second access observation information is broad-range access observation information to be used for observing the access pattern of the read access to the corresponding access area in the slot units.

* * * * *